Patented Apr. 17, 1934

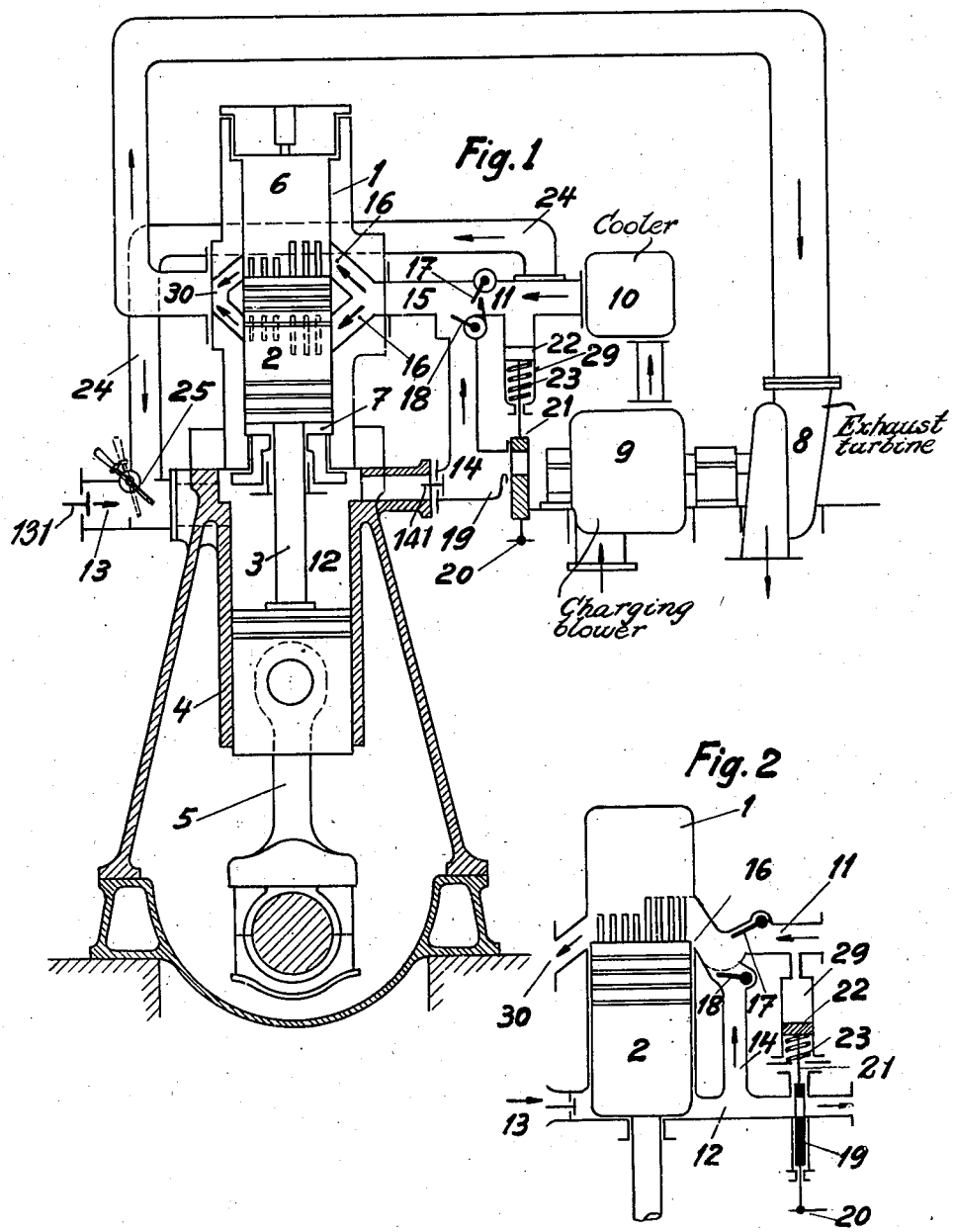

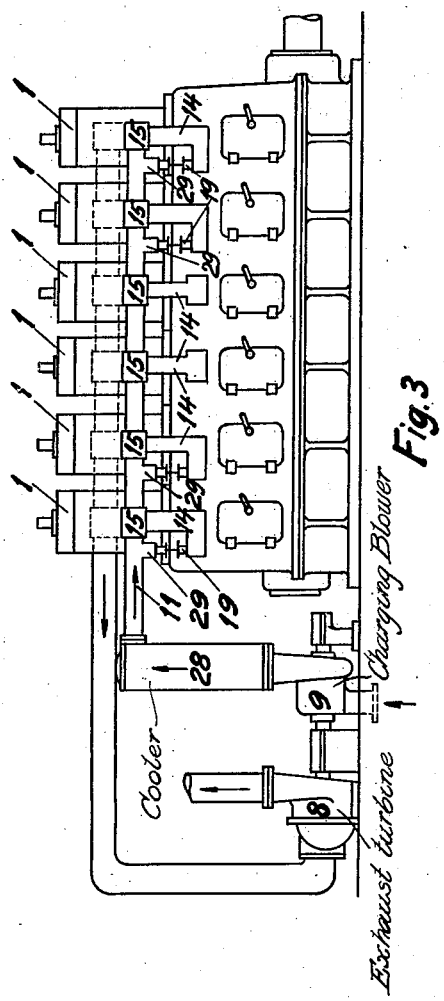

1,955,620

UNITED STATES PATENT OFFICE 1,955,620

INTERNAL COMBUSTION ENGINE

Alfred Buchi, Winterthur, Switzerland

Application November 17, 1927, Serial No. 234,014
In Switzerland November 19, 1926

2 Claims. (Cl. 60—13)

This invention relates to internal combustion engines used in combination with exhaust turbines and consists in this, that besides the charging blowers driven by exhaust turbines a plurality of piston pumps driven by the internal combustion engine act as additional charging blowers. By the sub-division of the piston blowers into a plurality of pumps, the delivery of scavenging and charging air to the cylinders can be made more uniform. This is more particularly of importance, when piston blowers are used in conjunction with blowers driven by the exhaust with the object of providing sufficient scavenging and charging air when machines of this kind are being started and when they are running at low loads, as in this case the blowers driven by exhaust turbines are not very efficient owing to the small energy in the exhaust. This provides the further possibility, when the load of the exhaust turbines increases and they have to deliver more power, of disconnecting the said piston blowers at least in part, thus enabling the internal combustion engine to give off more power to the outside and obtaining a better efficiency. It also becomes possible to co-ordinate to each combustion cylinder its own piston pump, thus providing a saving in piping and reducing pressure losses. The piston pumps may suitably be arranged in the extension of the axis of the combustion cylinders. In single-acting engines the lower side of the piston may be used as the pump space. In double-acting engines the crosshead guide may be formed into a pump. The air or the combustion mixture delivered by the piston blowers and the turbine driven blowers may be conveyed through common ports into the combustion cylinders. In the supply pipes of the piston pumps and of the turbine driven blowers leading to the combustion cylinders, stop valves may be provided. The piston pumps may be provided with means for interrupting their delivery, such that at certain loads they will run idle, that is, they will not perform any pumping work. The said interruption of the delivery may be effected by external means or automatically. As, when the turbine driven blower commences to deliver heavily, it is preferable to interrupt the delivery of the piston blowers, at least partially, this may be effected by means of the pressure of the turbine driven blower. The pipes leading to the piston blowers may be so arranged that they can draw by suction selectively from the atmosphere or from the delivery pipe of the turbine driven blower.

In the accompanying drawings several constructional examples of the invention are shown diagrammatically, the same or similar parts bearing the same reference numerals.

Figure 1 shows the invention as applied to double-acting, two-stroke engines,

Figure 2 shows the invention applied to a single-acting two-stroke engine,

Figure 3 shows an example in which the invention is applied to a multi-cylinder engine.

In Figure 1 of the drawings 1 is the combustion cylinder of a double-acting two-stroke engine, with the piston 2, the piston rod 3, the crosshead guide 4 and the connecting rod 5. 6 is the upper combustion space and 7 the lower combustion space. 8 is a turbine which is driven by the exhaust of the combustion cylinder and which drives a charging blower 9 which delivers its compressed air through the cooler 10, which may be of any known design, and the pipe 11 to the combustion cylinder, namely, into the cylinder space 6 or 7 according to whether the piston is in the neighbourhood of its bottom or top dead centre. In accordance with the invention besides the charging blower 9 driven by the exhaust turbine a plurality of piston pumps driven by the internal combustion engine act as additional charging blowers.

In the constructional example shown in Figure 1 the upper part of the crosshead guide forms the pump space 12. This pump 12 receives its air from the pipe 13 and delivers it through the pipe 14 also into the combustion cylinder 1. In the example shown, both the air coming from the turbine driven blower 9 and that from the piston pump 12 passes through a common pipe 15 and common ports 16 into the combustion cylinder. In the pipe 11 or 14 or in both, stop valves 17 or 18 may be provided. 19 is a stop valve in the pipe 14 which can be opened or closed by means of the handle 20. The stop valve 19, may, however, also be opened by means of a piston 22 and rod 21 which is for instance acted on by the pressure in the pipe 11 and by the spring 23. A pipe 24 and a stop valve 25 are also shown, which latter, according to the position in which it is set can shut off the piston pump 12 from the pipe 13 or from the pipe 24. The pipe 13 contains a non-return valve 131.

The internal combustion engine arranged in the manner shown in Figure 1 can operate in the following manner.

Assuming that the stop valve 25 opens the pipe 13 towards the pump cylinder 12 and the member 19 closes the pipe 14 to the atmosphere, the piston pump 12 will, on the engine being started, deliver scavenging air through the pipe 14 and the ports 16 into the power cylinder. As long as the pressure in the pipe 14 is higher than that in the pipe 11 the valve 17 will remain closed and there will be no direct delivery of air from the charging blower 9 into the cylinder 1. In order, however, that a certain amount of air shall pass through the charging blower 9, the stop valve 25 may be so adjusted that the quantity of air delivered will pass into the pipe 13 and the piston pump 12. This enables the air which has been only slightly compressed in the blower 9, but has thereby become heated, to be usefully employed, as starting is facilitated when warm air passes into the combustion cylinder. When the blower 9 is a turbo-blower, this manner of working is preferable, as it prevents surging which otherwise occurs when only small quantities are being delivered. When starting, the member 25 may however also be so adjusted that the pipe 13 is completely cut off from the pump 12. In this case the pump 12 receives its entire air from the blower 9. As, at the commencement of starting, the turbine 8 receives only a small amount of pressure medium (compressed air and subsequently exhaust) from the internal combustion engine and must first be accelerated, the blower 9 will, in the first instance, only deliver air at a low pressure and only when the speed of revolution and load on the engine increase will there be a delivery of more highly compressed air. At greater loads the blower 9 and the piston pump 12 may jointly deliver air to the pipe 15, or this delivery can be left to the blower 9 alone. In the latter case it is preferable completely to stop the delivery through the piston pump 12. This may for instance be effected by the valve 25 being closed to the pipe 24 and the valve 19 being opened. There will then be no delivery from the piston pump 12 and, as the pressure produced by the blower 9 is greater in the pipe 15 than in the pipe 14, while there is only atmospheric pressure, the automatic stop valve 18 will shut off the pipe 15 from the pipe 14. The valve 19 may be operated by means of the handle 20 or by suitably adjusting the piston 22. On the said piston 22 for instance the pressure in the pipe 11 coming from the charging blower 9 may be caused to act in such a manner that, from a definite delivery pressure of the said blower onwards, the valve 19 will open, thus interrupting the delivery of the piston pump 12 into the combustion cylinder.

By this means air at a higher pressure could be delivered to the combustion cylinder, for the purpose of getting more power out of the engine. The pump 12 may be provided with a preferably automatically acting outlet valve 141. The stop valve 18 may, on the other hand, be the sole outlet valve from the pump 12, and should be placed as near as possible to the pump cylinder, so as to make the waste spaces as small as possible. When this is the case the stop valve 18 acts also as outlet valve for the pump 12. During the suction stroke the valve 18 is closed as the pressure in pipe 14 becomes low. When the compression begins, the pressure in pipe 14 rises and when the pressure is as high as in the space 15 the valve 18 starts to open. The efficiency of the operation is somewhat smaller, as the compression space comprises also pipe 14 and the re-expansion at the beginning of the suction stroke is greater and the volumetric efficiency therefore smaller.

This construction works with a somewhat lower efficiency but is of simpler design and therefore cheaper, owing to the lack of special outlet valves.

In Figure 2 of the drawings 1 is the combustion cylinder of a single-acting two-stroke engine. The space below the piston forms the pump space 12. This pump receives the air through the pipe 13 and delivers it through the pipe 14, the stop valve 18 and the ports 16 to the combustion cylinder.

In Figure 3 an engine having six combustion cylinders 1 is shown. 8 is the exhaust turbine which drives a blower 9. This blower 9 delivers its air through a cooler 28 which may be of any known design and the pipes 11 and 15 to the combustion cylinders 1. The piston pumps 12, which are not shown, are assumed to be similar to that shown in Figure 1 or 2 and to deliver the air through the pipes 14 to the combustion cylinders. Of the six combustion cylinders four are provided with cylinders 29 which communicate with the pipes 11 and in which pistons 22 and springs 23 are provided for operating stop valves 19 of the kind shown in Figures 1 and 2.

In this constructional form the piston pumps can only be shut off with four of the combustion cylinders. Such an arrangement might be used with engines, in which there is never as much energy in the exhaust gases as would suffice alone for delivering air through the blower 9. In this case the piston pumps of the two middle cylinders would always work at all loads.

Having now described my invention, what I claim as new and desire to secure by Letters Patent is:—

1. In a power plant combination, comprising an internal combustion engine, a plurality of combustion cylinders, an exhaust gas turbine, a charging blower, said charging blower driven by said exhaust gas turbine, conduit means to connect said charging blower to all of said combustion cylinders, a piston pump for each combustion cylinder, conduit means to connect each of said piston pumps to a combustion cylinder, said conduit means for the exhaust turbine driven blower and said conduit means for the piston pumps connected to common inlet ports of said combustion cylinders, conduit means from the delivery side of the exhaust turbine driven blower to the suction side of the piston pumps, conduit means from the suction side of said piston pumps to the atmosphere, a valve therein, whereby this valve in one position both opens said conduit to the atmosphere and closes said conduit from the delivery side of the exhaust turbine driven blower and in another position both closes said conduit to the atmosphere and opens the conduit from the delivery side of said exhaust driven blower.

2. In a power plant combination comprising an internal combustion engine, a plurality of combustion cylinders, an exhaust gas turbine, a charging blower, said charging blower driven by said exhaust gas turbine, conduit means to connect said charging blower to all of said combustion cylinders, non-return valves inserted in said conduit means between said charging blower and said combustion cylinders, a piston pump for each combustion cylinder, means for automatically interrupting the delivery of said piston pumps, said means for automatically interrupting the delivery of said piston pumps provided for each piston pump and responsive to the pressure in conduit means, connecting the exhaust gas turbine driven charging blower to the combustion cylinders, non-return valves inserted in said conduit means between said piston pumps and said combustion cylinders, said conduit means for the exhaust turbine driven charging blower and said conduit means for the piston pumps connected to common inlet ports of said combustion cylinders.

ALFRED BUCHI.